US012011821B2

(12) United States Patent
Johansson Mann et al.

(10) Patent No.: US 12,011,821 B2
(45) Date of Patent: Jun. 18, 2024

(54) INSULATING TOOL COVER ASSEMBLY

(71) Applicant: ATLAS COPCO INDUSTRIAL TECHNIQUE AB, Stockholm (SE)

(72) Inventors: Tim Kristoffer Johansson Mann, Stockholm (SE); Robin Kjell Åman, Spånga (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 336 days.

(21) Appl. No.: 17/765,902

(22) PCT Filed: Sep. 10, 2020

(86) PCT No.: PCT/EP2020/075333
§ 371 (c)(1),
(2) Date: Apr. 1, 2022

(87) PCT Pub. No.: WO2021/069173
PCT Pub. Date: Apr. 15, 2021

(65) Prior Publication Data
US 2022/0347830 A1 Nov. 3, 2022

(30) Foreign Application Priority Data
Oct. 8, 2019 (SE) .................................... 1930320-5

(51) Int. Cl.
*B25G 1/12* (2006.01)
*B25F 5/02* (2006.01)

(52) U.S. Cl.
CPC . *B25G 1/12* (2013.01); *B25F 5/02* (2013.01)

(58) Field of Classification Search
CPC .... B25F 5/02; B25G 1/00; B25G 1/01; B25G 1/12; B25G 1/125; B25B 17/00; B25B 23/00; H01B 17/62; H01B 17/42
See application file for complete search history.

(56) References Cited

U.S. PATENT DOCUMENTS 3,476,960 A * 11/1969 Rees ...................... H02K 7/145 310/216.118
5,006,740 A 4/1991 Palm
(Continued)

FOREIGN PATENT DOCUMENTS

DE 8216031 U1 6/1985
DE 202018101989 U1 8/2019
(Continued)

OTHER PUBLICATIONS

Atlas Copco Industrial Technique AB, Swedish Patent Application No. 1930320-5, Search Report, Mar. 23, 2020.
(Continued)

*Primary Examiner* — Robert J Scruggs
(74) *Attorney, Agent, or Firm* — Moore & Van Allen PLLC; W. Kevin Ransom

(57) ABSTRACT

The present specification relates to an electrically insulating tool cover assembly adapted to cover at least a front portion of a power tool, comprising a first and a second cover portion adapted to, in use, together cover the front portion of the power tool, and a releasable retaining element adapted to cooperate with a corresponding mating structure at the first and second cover portions, in order to hold the first and second cover portions together. The first and second cover portions and the retaining element are made of an electrically insulating material, such that in use, an electrical insulation may be provided for at least a part of the front portion of the power tool, and the first end is a front end of the tool cover assembly adapted to, in use, be arranged at the front end of the power tool.

14 Claims, 2 Drawing Sheets

(56) References Cited

U.S. PATENT DOCUMENTS

| | | | | |
|---|---|---|---|---|
| 5,347,684 | A | 9/1994 | Jackson | |
| 2002/0170185 | A1 | 11/2002 | Kondo et al. | |
| 2007/0062005 | A1 | 3/2007 | Beruscha et al. | |
| 2012/0111159 | A1* | 5/2012 | Wu | B25G 1/125<br>81/467 |
| 2014/0053689 | A1 | 2/2014 | Lai | |
| 2015/0096778 | A1* | 4/2015 | Schneider | B25B 23/0035<br>174/138 R |
| 2015/0196363 | A1* | 7/2015 | Aman | A61B 17/1622<br>53/425 |
| 2016/0225495 | A1* | 8/2016 | Kugler | B25G 1/12 |
| 2017/0157760 | A1 | 6/2017 | Mcauliffe et al. | |
| 2018/0361561 | A1 | 12/2018 | Frenken | |
| 2019/0314960 | A1 | 10/2019 | Popiolek | |

FOREIGN PATENT DOCUMENTS

| | | | |
|---|---|---|---|
| JP | 2009262296 | A | 11/2009 |
| WO | 2016036784 | A1 | 3/2016 |

OTHER PUBLICATIONS

Atlas Copco Industrial Technique AB, International Patent Application No. PCT/EP2020/075333, International Search Report, Oct. 12, 2020.

Atlas Copco Industrial Technique AB, International Patent Application No. PCT/EP2020/075333, Written Opinion, Oct. 12, 2020.

Atlas Copco Industrial Technique AB, International Patent Application No. PCT/EP2020/075333, International Preliminary Report on Patentability, Aug. 31, 2021.

* cited by examiner

INSULATING TOOL COVER ASSEMBLY

CROSS-REFERENCE TO RELATED APPLICATIONS

This application is a National Stage Patent Application (filed under 35 § U.S.C. 371) of PCT/EP2020/075333, filed Sep. 10, 2020 of the same title, which, in turn claims priority to Swedish Patent Application No. 1930320-5 filed Oct. 8, 2019 of the same title; the contents of each of which are hereby incorporated by reference.

FIELD OF THE INVENTION

The present invention generally relates to a tool cover for at least a front part of a power tools, more particularly to such a cover having electrically insulating properties.

BACKGROUND OF THE INVENTION

Electrical power tools, for example tightening tool used for tightening of screw joints are known to be used in various industries. Commonly, some or most parts of such tools are made of metal, e.g. steel. Especially so parts of or even the complete housing which is also the parts which an operator comes into contact with.

Apart from being strong and durable, such materials tend to be good conductors and thus problems related to operator safety may arise when for example screw tightening is performed in the vicinity of power sources such as batteries or other energized components. Due to the conductive properties of the tool housing, there is a high risk of electrical shock should the tool come into contact with energized parts. Such a shock could harm not only the operator should the operator touch the socket or parts of the tool in electrical contact with the socket but could also cause short circuits damaging components in vicinity of the joint to be tightened.

In order to alleviate some of these problems, attempts have been made to provide an insulting outer layer, for example covers or sleeves provided on the outside of the power tool to thereby provide insulation for operator protection purposes.

However, there are still problems remaining for example in that such covers tend to be complex to handle and arranged on the tool and increase complexity of the operation and workplace. Hence there exists a need for improvement in the field of insulation and electric shock protection for power tools.

SUMMARY OF THE INVENTION

Accordingly, it would be desirable to provide an insulating tool cover which may be easily and securely fitted to a power tool. In particular, it would be desirable to provide such a cover which improves the versatility of the cover and thus work place efficiency. To better address one or more of these concerns an insulating tool cover, a kit, and a method as defined in the independent claims are provided. Preferred embodiments are defined in the dependent claims.

According to a first aspect of the invention an electrically insulating tool cover assembly adapted to at least partly cover at least a front portion of a handheld power tool is provided, the cover assembly comprising a first cover portion and a second cover portion adapted to, in use, together cover at least the front portion of the power tool, and a releasable retaining element adapted to cooperate with a corresponding mating structure arranged at a respective first end of the first- and second cover portion, in order to hold the first and second cover portion together, wherein the first and second cover portion and the retaining element are made of an electrically insulating material, such that in use, an electrical insulation may be provided for at least a part of the front portion of the power tool, and wherein the first end is a front end of the tool cover assembly adapted to, in use, be arranged at the front end of the power tool.

According to the first aspect, the insulating tool cover provides an inventive solution to the concerns described above by means of a design incorporating a first and a second cover portion and a releasable retaining element arranged at the front end of the cover assembly, i.e. the end which in use may be described as the front end and hence at the front end of the power tool, which facilitates the arrangement of the cover on a tool. Further, as the retaining element is not only releasable but arranged at the front end of the cover and hence the tool, the adaptability and usability of the cover assembly is greatly improved in that the retaining element may also provide an exchangeable adapter functionality providing a possibility to easily adapt the now insulated tool to a tool accessory for example in the case of a tightening tool to a type of socket used. Hereby, proper insulation may be achieved regardless of the shape and size of the socket without time consuming changes of the whole cover assembly but by a simple change of the first retaining element with the first and second cover portion remaining arranged on the power tool.

Hence, the inventive design of the cover assembly according to independent claim 1 cleverly provides convenient arrangement of the cover on the tool as well as reduces the complexity of adapting the tool to various tasks.

The referenced power tool which the inventive cover assembly may be adapted to at least partly cover may be a handheld power tool, for example a pneumatic or electrical power tool, possibly a battery driven tool. Examples include a tightening tool such as a screw driver of any of the above mentioned types.

The actual design, i.e. the shape of the cover assembly, more particularly the cover formed by the first and second cover portion may be suitably adapted to the shape of the tool on which the cover is adapted to be arranged. For example, the shape of the first and second portion may in some embodiments even be described as congruent to the shape of the surface of the tool covered whereas in other embodiment a more generic shape may be sufficient.

For example, in some embodiment, the first and second portion of the cover form a first and a second half of the cover, the first and second half being defined by a cross section in a plane parallel to a longitudinal center line. In the exemplary case of a pistol tool, According to one embodiment, the retaining element comprises a cylindrical surface portion adapted to cooperate with a corresponding cylindrical surface portion formed by a first surface portion comprised by the first cover portion and a second surface portion comprised by the second cover portion, thereby holding the first and second cover portion together. For example, in one embodiment, the first surface portion may be described as, forming a first substantially circular end opening of the assembled cover such that a socket may be received by the power tool through this opening when the cover is arranged on the tool. In some embodiments, the corresponding mating structure may, when assembled, form this first substantially circular end opening.

According to one embodiment, the cylindrical portion comprises a thread adapted to cooperate with a corresponding thread comprised by the corresponding surface portion i.e., the corresponding mating structure may comprise a thread.

According to one embodiment, the cylindrical surface portion is an outer surface portion and the corresponding cylindrical surface portion formed by the first surface portion of the first cover portion and the second surface portion of the second cover portion is an inner surface portion. In such an embodiment, the retaining element may comprise an outer thread, whereas the first and second cover portion (or more particularly the corresponding mating structures thereof) may comprise an outer thread.

According to another embodiment, the cylindrical surface portion is an inner surface portion and the corresponding cylindrical surface portion formed by the first surface portion of the first cover portion and the second surface portion of the second cover portion is an outer surface portion.

According to one embodiment, the retaining element further comprises a second axially extending portion adapted to, in use, at least partly cover a tool accessory attached to a front end of the tool. Such a tool accessory may in the case be a socket in the case of a tightening tool. Examples include a cylindrical second axially extending portion or a slightly conical axially extending portion. The axial length and the radius of the second portion may be chosen depending on the design of the socket which the retaining element is adapted to cover. By axial should for the second axially extending portion be understood an axial direction of the retaining element itself, which would also be the axial direction of a socket.

According to one embodiment, the cover assembly further comprises a second retaining structure arranged at a second, rear end of the first- and second portion of the cover and adapted to cooperate with a corresponding second mating structure arranged a at a second, rear end of the first- and second cover portion, thereby holding the first and second cover portion together. One example could include a rear retaining ring, i.e. a circular or cylindrical retaining element. Such a rear retaining ring may comprise a thread adapted to cooperate with a corresponding thread on the first and second cover portion.

According to one embodiment, the second retaining element is a resilient ring shaped retaining element adapted to encircle the first and second cover portion at the rear end. By resilient should be understood a material adapted to deform elastically without deforming plastically under the loads exerted when placing the ring on the cover. Such a ring shaped element may be made of rubber or a suitable elastomer.

According to another embodiment, the second retaining element is a retaining clamp, and wherein the second mating structure comprises an opening formed partly in the first cover portion and partly in the second portion. Such a clamp may for example have a partially cylindrical cross section.

According to one embodiment, the tool cover assembly is adapted to cover at least 30% of the surface area of the power tool, preferably 50%, in some embodiments up to 75% of the surface area. For example, in some embodiments, the cover may be adapted to cover more or less the entire tool possibly with the exception of a handle portion which commonly is covered in rubber or similar non-conductive materials to improve the ergonomics of the tool in terms of grip and therefore are nonconductive to begin with. According to one embodiment, the electrically insulating material is a polymer, a plastic or rubber.

According to one embodiment, the first and second cover portion and/or the retaining element have a color different from that of the power tool. This may be advantageous in that a clear visual indication may be provided to the user that the electrical insulation is provided and mitigates the risk of a user choosing a non-insulated tool for a high-voltage application.

According to one embodiment, at least one of the first and second cover portion comprises means for, in use, providing an air gap between the tool and the cover such that air may circulate between the tool and the cover. This is advantageous in that the provision of the electrical insulation may in some cases have a negative impact on heat transfer from the tool, for example the motor or the gears, which may in turn negatively influence tool performance. In some embodiments, this may be accomplished by designing the tool cover assembly to be slightly larger than the tool such that a gap may be formed in between, the means may in such an embodiment comprise a shoulder or protruding structure supporting the larger cover on the tool such that a gap may prevail. In some embodiments, at least one of the first and second cover portion may comprise ribs arranged on an inner surface thereof adapted to in use face the tool, such that air may circulate between the tool and the cover by means of channels formed between the ribs. Other examples include internal channels formed in at least one of the first and second cover portion.

According to a second aspect of the present invention, a power tool comprising an electrically insulated tool cover assembly according to any of the embodiments described above is provided, possibly a handheld tool. According to one embodiment of the second aspect the power tool is a handheld electrical power tool, possibly a battery powered tool.

According to a third aspect of the present invention, a kit comprising a first cover portion, a second cover portion and at least a first and a second retaining element adapted to cooperate with a corresponding mating structure arranged at a first end of the first- and second portion of the cover, thereby holding the first and second cover portion together is provided, wherein the dimensions of the first and second releasable retaining element differ from each other. Accordingly, in such a kit, several retaining element of for example different length and/or diameter may be provided to enable fast adaption of the cover assembly for example in the case of a tightening tool to a type of socket used such that proper insulation may be achieved regardless of the shape and size of the socket used as described above. According to one embodiment, the cover assembly is adapted to at least partly cover a tightening tool, and the kit further comprises at least one socket. Hereby, properly adapted first retaining element may be provided to provide an optimal fit to the comprised sockets.

According to a fourth aspect of the present invention, a method for providing electrical insulation for at least a front part of a power tool is provided, the method comprising the steps of providing a first cover portion for covering a front part of the tool, providing a second cover portion for covering a front part of the tool and providing at least a first and a second retaining element adapted to cooperate with a corresponding mating structure arranged a at a first end of the first- and second cover portion in order to hold the first and second cover portion together, wherein the dimensions of the first and second retaining element differ from each other. According to one embodiment, the method may further comprise the step of choosing a retaining element from the first and second retaining element depending on a tool condition. The task may be a tightening of a joint and the condition may involve a choice of socket for the tightening.

Objectives, advantages and features of the power tool, retaining element, kit, and method conceivable within the respective scopes of the further aspect of the invention are readily understood by the foregoing discussion referring to the first aspect of the invention.

Further objectives of, features of and advantages of the present invention will become apparent when studying the following detailed disclosure, the drawings, and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION OF THE INVENTION

Figure 1:
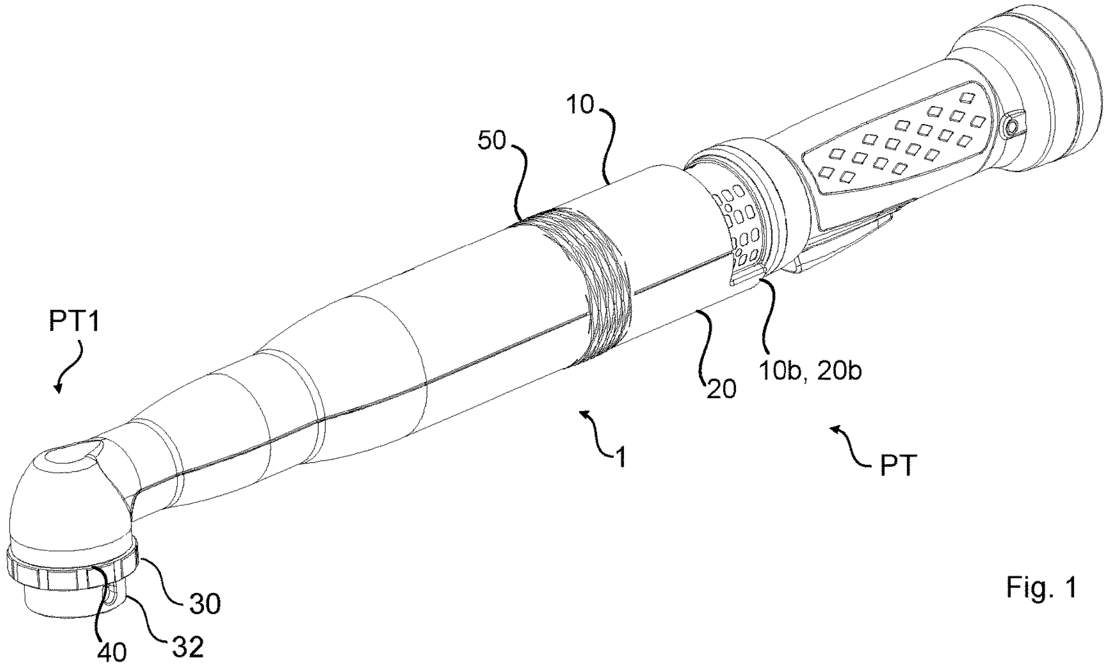
FIG. 1 is a perspective view of an exemplary cover assembly according to one embodiment.

An exemplary insulating tool cover assembly (1) is shown in FIG. 1, arranged on a power tool PT (in the illustrated case a handheld angled tightening tool) to thereby provide electrical insulation by covering a front portion PT1 of the tool PT.

The cover assembly comprises a first cover portion 10 and a second cover portion 20 which as may be seen form FIG. 1 each from approximately one half of an assembled cover structure and together cover the front portion PT1 of the power tool, and a releasable retaining element 30 arranged at the front end 10*a*,20*a* of the cover assembly in order to hold the first and second cover portion 10, 20 together. In the illustrated embodiment, the first and second cover portion 10, 20 extend over approximately ⅔ of the axial length of the power tool and thus cover approximately ⅔ of the surface area of the tool PT. The remaining part of the power tool PT not covered is mainly the handle of the tool, which is in itself covered in rubber, i.e. it is non-conductive as such.

The first and second cover portion 10, 20 as well as the retaining element 30 are in order to provide the insulation needed made of a plastic material. Moreover, not visible in the black and white FIG. 1, the first and second cover portion 10, 20 have a bright color different from that of the power tool in order to visually convey to a user that the tool is provided with insulation.

The retaining element 30 is in the illustrated embodiment ring shaped, i.e. substantially cylindrical, and arranged at a first substantially circular end opening 40 of the assembled cover. A first portion 31 of the retaining element, in this case a cylindrical first portion comprising a thread is arranged in the opening 40. The retaining element 30 further comprises a second axially extending portion 32 adapted to, in use, partly cover a socket (not shown) attached at the front end PT1 of to the tool.

A second retaining structure 50 in the form of a resilient ring 50 is arranged at a suitable distance from a rear end of the cover 10*b*, 20*b* to hold the first and second cover portion together at this rear end.

Figure 2:
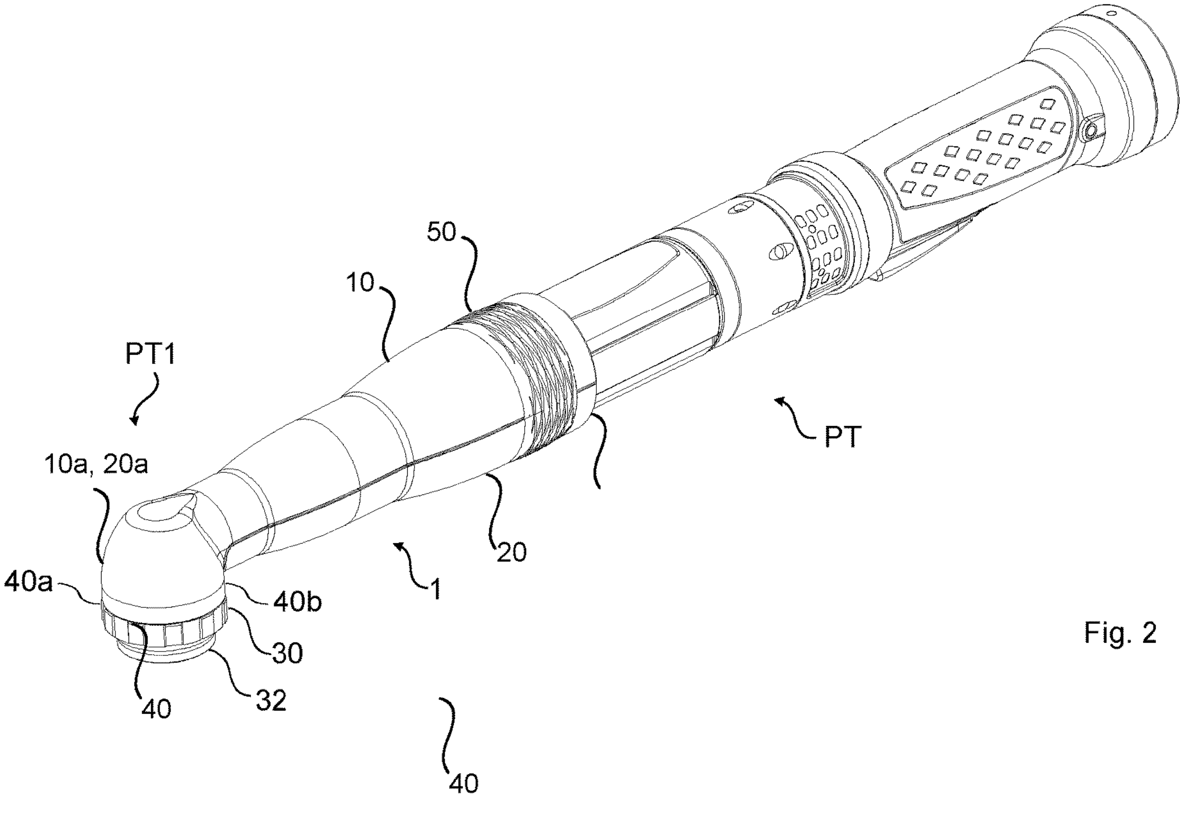
FIG. 2 is a perspective view of an exemplary cover assembly according to one embodiment.

A second exemplary embodiment of the insulating tool cover assembly (1) is shown in FIG. 2. As for the embodiment shown in FIG. 1, the cover assembly comprises a first cover portion 10 and a second cover portion made from an insulating plastic material 20 which together cover the front portion PT1 of the power tool, and a releasable retaining element 30 arranged at the front end 10*a*, 20*a* of the cover assembly. However, the embodiment of FIG. 2 is shorter compared to the first embodiment and the first and second cover portion 10, 20 extend over approximately ⅓ of the axial length of the power tool.

Figure 3:
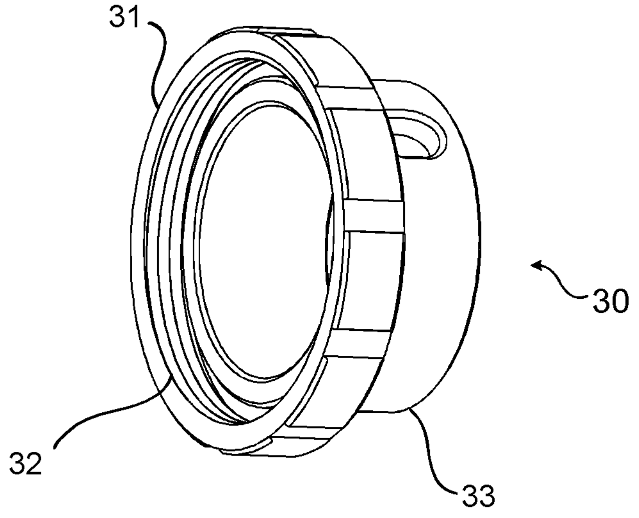
FIG. 3 is a perspective view of an exemplary retaining element according to one embodiment.

A first retaining element 30 according to one embodiment is shown in greater detail in FIG. 3. The illustrated retaining element 30 comprises a cylindrical surface portion 31 comprising a thread 32 adapted to cooperate with a corresponding thread on a cylindrical surface portion 40 formed by a first surface portion 40*a* comprised by the first cover portion 10 and a second surface portion 40*b* comprised by the second cover portion 20 together forming a first substantially circular end opening 40 of the assembled cover. The retaining element 30 further comprises a second axially extending portion 33 adapted to, in use, as mentioned above partly cover a socket.

In order to provide the electrical insulation, the user arranges the first and second cover portions to cover the front part of the tool followed by applying the first retaining element at the front end of the tool and the second rear retaining clamp 60 at the rear end of the cover in order to hold the cover portions firmly together. Preferably, the user is provided with not only one first retaining element 30 but a kit comprising a number of such elements 30 differing in size and design, such that, based on in the illustrated embodiment the choice of socket to be attached at the tool, a suitable retaining element 30 ensuring sufficient insulation may be chosen and applied by the user.

While the invention has been illustrated and described in detail in the drawings and foregoing description, such illustration and description are to be considered illustrative or exemplary and not restrictive; the invention is not limited to the disclosed embodiment. The skilled person understands that many modifications, variations, and alterations are conceivable within the scope as defined in the appended claims. Additionally, variations to the disclosed embodiments can be understood and effected by those skilled in the art in practicing the claimed invention, form a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. Electrically insulating tool cover assembly adapted to at least partly cover at least a front portion of a handheld power tool, said cover assembly comprising:

a first cover portion and a second cover portion adapted to, in use, together cover at least said front portion of said power tool; and a releasable retaining element adapted to cooperate with a corresponding mating structure arranged at a respective first end of said first and second cover portions, in order to hold said first and second cover portions together, wherein said first and second cover portions and said retaining element are made of an electrically insulating material, such that in use, an electrical insulation may be provided for at least a part of said front portion of said power tool, and wherein said first end of said first and second cover portions is a front end of said tool cover assembly adapted to, in use, be arranged at said front end of said power tool, wherein said retaining element comprises a cylindrical surface portion adapted to cooperate with a corresponding cylindrical surface portion formed by a first surface portion comprised by said first cover portion and a second surface portion comprised by said second cover portion together forming a first substantially circular end opening of the assembled cover, thereby holding said first and second cover portion together and wherein said cylindrical portion comprises a thread adapted to cooperate with a corresponding thread comprised by said corresponding surface portion.

2. Tool cover according to claim 1, wherein said cylindrical surface portion is an outer surface portion and said corresponding cylindrical surface portion formed by said first surface portion of said first cover portion and said second surface portion of said second cover portion is an inner surface portion.

3. Tool cover according to claim 1, wherein said cylindrical surface portion is an inner surface portion and said corresponding cylindrical surface portion formed by said first surface portion of said first cover portion and said second surface portion of said second cover portion is an outer surface portion.

4. Tool cover assembly according to claim 1, wherein said retaining element further comprises a second axially extending portion adapted to, in use, at least partly cover a tool accessory attached to a front end of said tool.

5. Tool cover assembly according to claim 1, further comprising a second retaining structure arranged at a second, rear end of said first- and second portion of said cover and adapted to hold said first and second cover portion together.

6. Tool cover assembly according to claim 5, wherein said second retaining structure is a resilient ring shaped element adapted to encircle a portion of said rear end of said first- and second cover portion.

7. Tool cover assembly according to claim 1, wherein said tool cover is adapted to cover at least 30% of the surface area of said power tool.

8. Tool cover assembly according to claim 1, wherein at least one of said first and second cover portion comprises means for, in use, providing an air gap between said tool and said cover such that air may circulate between said tool and said cover.

9. Tool cover assembly according to claim 1, wherein said first and second cover portion and/or said retaining element have/has a color different from that of the power tool.

10. Tool cover assembly according to claim 1, wherein said tool cover is adapted to cover at least 50% of the surface area of said power tool.

11. Hand held power tool comprising an electrically insulated tool cover assembly comprising:

a first cover portion and a second cover portion adapted to, in use, together cover at least said front portion of said power tool, and a releasable retaining element adapted to cooperate with a corresponding mating structure arranged at a respective first end of said first and second cover portions, in order to hold said first and second cover portions together, wherein said first and second cover portions and said retaining element are made of an electrically insulating material, such that in use, an electrical insulation may be provided for at least a part of said front portion of said power tool, and wherein said first end of said first and second cover portions is a front end of said tool cover assembly adapted to, in use, be arranged at said front end of said power tool, wherein said retaining element comprises a cylindrical surface portion adapted to cooperate with a corresponding cylindrical surface portion formed by a first surface portion comprised by said first cover portion and a second surface portion comprised by said second cover portion together forming a first substantially circular end opening of the assembled cover, thereby holding said first and second cover portion together and wherein said cylindrical portion comprises a thread adapted to cooperate with a corresponding thread comprised by said corresponding surface portion.

12. Power tool according to claim 11, wherein said power tool is an electrically powered tool.

13. Kit comprising a first cover portion, a second cover portion and at least a first and a second retaining element adapted to cooperate with a corresponding mating structure arranged at a first end of said first and second cover portions of said cover, thereby holding said first and second cover portions together, wherein said first and second retaining element comprises a cylindrical surface portion adapted to cooperate with a corresponding cylindrical surface portion formed by a first surface portion comprised by said first cover portion and a second surface portion comprised by said second cover portion together forming a first substantially circular end opening of the assembled cover, thereby holding said first and second cover portions together and wherein said cylindrical portion comprises a thread adapted to cooperate with a corresponding thread comprised by said corresponding surface portion and wherein said first and second retaining element differ from each other.

14. Method for providing electrical insulation for at least a front part of a power tool comprising the steps of:

providing a first cover portion for covering a front part of said tool;

providing a second cover portion for covering a front part of said tool;

providing at least a first and a second retaining element adapted to cooperate with a corresponding mating structure arranged a at a first end of said first and second cover portions in order to hold said first and second cover portions together, wherein said first and second retaining element comprises a cylindrical surface portion adapted to cooperate with a corresponding cylindrical surface portion formed by a first surface portion comprised by said first cover portion and a second surface portion comprised by said second cover portion together forming a first substantially circular end opening of the assembled cover, thereby holding said first and second cover portion together and wherein said cylindrical portion comprises a thread adapted to cooperate with a corresponding thread comprised by said corresponding surface portion, and wherein the dimensions of said first and second retaining element differ from each other.

* * * * *